United States Patent [19]

Kramer et al.

[11] Patent Number: 5,443,877
[45] Date of Patent: Aug. 22, 1995

[54] GLAZING LAMINATE HAVING A REPLACEABLE SACRIFICIAL LAYER

[75] Inventors: John R. Kramer, Midlothian, Ill.; Larry V. Young, Trafalger, Ind.

[73] Assignee: General Electric Company, Pittsfield, Mass.

[21] Appl. No.: 204,123

[22] Filed: Mar. 1, 1994

[51] Int. Cl.⁶ .................. B32B 17/00; B32B 27/36; B65D 65/28
[52] U.S. Cl. .................. 428/43; 428/412; 428/429; 428/442; 428/451; 428/483; 428/522; 156/106; 156/326; 156/344
[58] Field of Search ............ 428/412, 413, 483, 522, 428/429, 442, 451; 156/106, 326, 344

[56] References Cited

U.S. PATENT DOCUMENTS

| | | |
|---|---|---|
| Re. 24,906 | 12/1960 | Ulrich . |
| 1,308,477 | 7/1919 | Blanchard . |
| 2,332,461 | 10/1943 | Muskat et al. . |
| 2,736,721 | 2/1956 | Dexter . |
| 2,814,601 | 11/1957 | Currie et al. . |
| 2,857,356 | 10/1958 | Goodwin . |
| 3,299,010 | 1/1967 | Samour . |
| 3,406,086 | 10/1968 | Foster . |
| 3,535,293 | 10/1970 | Anderson . |
| 3,539,442 | 11/1970 | Buckley et al. . |
| 3,558,574 | 1/1971 | Doehnert . |
| 3,707,397 | 12/1972 | Gagnon . |
| 3,843,390 | 10/1974 | Hudson et al. . |
| 3,945,044 | 3/1976 | McGee et al. . |
| 4,076,373 | 2/1978 | Moretti . |
| 4,128,694 | 12/1978 | Fabel et al. . |
| 4,138,746 | 2/1979 | Bergmann . |
| 4,278,876 | 7/1981 | Ashby et al. . |
| 4,370,358 | 1/1983 | Hayes et al. . |
| 4,478,876 | 10/1984 | Chung . |
| 4,791,163 | 12/1988 | Traver et al. . |
| 4,945,002 | 7/1990 | Tanuma et al. .................. 428/41 |
| 5,126,208 | 6/1992 | Larson . |
| 5,190,827 | 3/1993 | Lin . |

Primary Examiner—P. C. Sluby

[57] ABSTRACT

A laminate structure comprising a substrate or a core laminate to which a film or film laminate is replaceably adhered.

15 Claims, 2 Drawing Sheets

GLAZING LAMINATE HAVING A REPLACEABLE SACRIFICIAL LAYER

BACKGROUND OF THE INVENTION

The predominant glazing material used by operators of urban transit systems is tempered or laminated glass. Where breakage is a concern, more expensive plastic glazing materials such as polycarbonate sheet are used because it is as clear as glass and virtually unbreakable. The cost of polycarbonate glazing may be as much as a factor of four or five times greater than the cost of similar gauges of glass. While plastic glazing is generally less breakable than glass glazing, it is more susceptible to being defaced by scratches and vandalism than glass glazing. Because the scratches are hard to disguise and when disguised interfere with visibility, scratched or vandalized plastic glazing must be replaced. Use of glass based glazing laminates for transportation applications is not an acceptable alternative insofar as when the glass glazing is broken, the bus or train wherein the glazing material is so damaged must be immediately pulled from service for replacement and repair of the damaged window or glazing material. Thus issues of public safety and convenience militate for less breakable glazing materials.

Glazing laminates are known and used in a variety of applications. One example is automobile safety glass which has typically comprised two layers or sheets of glass separated by an interlayer of a tough transparent plastic such as a plasticized polyvinylacetal. Laminates comprising polycarbonate sheets in contact with plasticized polyvinylacetal sheets are described in U.S. Pat. Nos. 3,406,086, 3,539,442, and 4,128,694. A more recent U.S. Pat. No. 5,126,208 describes a non-symmetrical glass plastic laminate wherein the plastic may be polycarbonate or polyacrylate. Thus the laminates may either be symmetrical or unsymmetrical about the substrate which may be any one of several optical materials such as glass, polycarbonate, polyacrylate, and the like. The materials being laminated to the substrate must possess both acceptable optical properties and durability and these criteria must also apply to the adhesives used to effect the bonds between the laminar layers.

SUMMARY OF THE INVENTION

The instant invention pertains to laminates where one or more of the layers may be conveniently replaced. Thus the apparatus of the invention comprises a substrate and a film which are replaceably adhered one to the other, thereby facilitating a convenient replacement of the film. When the substrate is not a homogeneous material but rather is itself a laminate or a composite laminate it is hereinafter referred to as a core laminate. When the film is not a homogeneous material but rather is itself a laminate or a composite laminate it is hereinafter referred to as a film laminate.

In an embodiment of the instant invention, the materials selected to form the laminate of the invention have either sufficient translucency or transparency to be useful as a glazing material. In a particular embodiment of the instant invention, the replaceable nature of the film layer produces an easily repairable glazing material when such glazing material has been damaged or defaced, the terms damage or defaced being used synonomously.

Since the film or film laminate is replaceably adhered to the substrate or core laminate a new method of laminating a glazing composite is herewith disclosed. The replaceable nature of the film or film laminate comprising the laminate of the invention also enables a method of repairing said laminate when said laminate is damaged or defaced or otherwise rendered unsuitable for its intended use.

DETAILED DESCRIPTION OF THE INVENTION

Figure 1A:
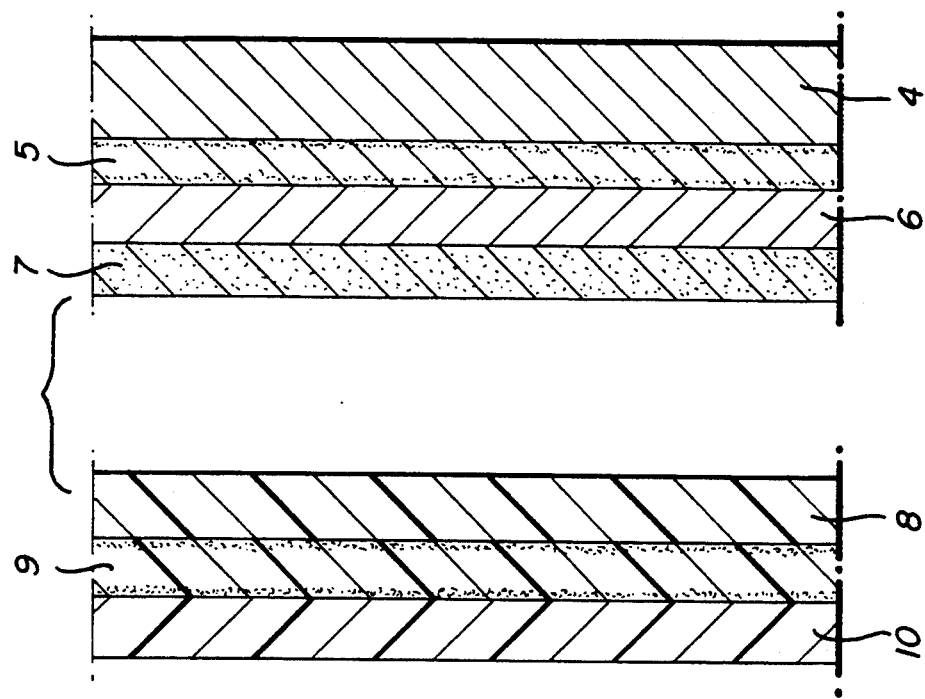
FIG. 1a A cross-sectional view of the glazing laminate showing a core laminate and a film laminate prior to assembly as the glazing laminate of the invention.
Figure 1:
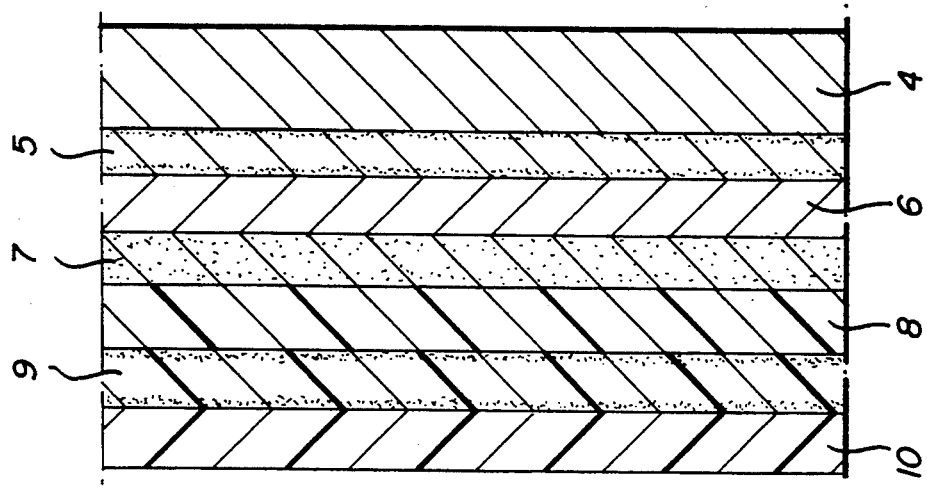
FIG. 1 A cross-sectional view of the glazing laminate of the invention showing a core laminate laminated to a film laminate.

In one embodiment of the instant invention, as shown in FIG. 1, a substrate, 4, having an optional primer layer, 5, and a hardcoat layer, 6, comprises a core laminate which laminate is a lameliar composite that is to be laminated to a second lameliar composite which second lameliar composite is a film laminate, 8, having on one side an optional primer layer, 9, and a hardcoat layer, 10, and on the other side a pressure sensitive adhesive, 7, which bonds the substrate or core laminate to the film or film laminate. In this embodiment, the film may be used either as an interior or an exterior surface of the glazing laminate of the instant invention.

In FIG. 1a, the embodiment of FIG. 1 is shown prior to lamination to produce the laminate of the invention; specifically what is shown is a film laminate additionally comprising a layer of pressure sensitive adhesive prior to being replaceably adhered to the core laminate.

Figure 2:
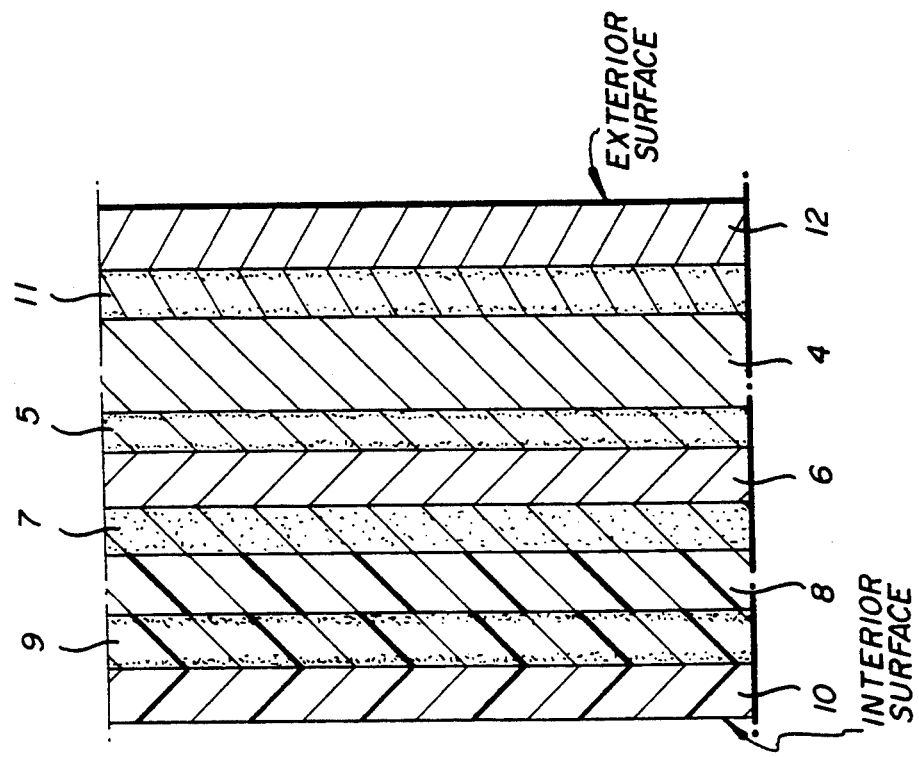
FIG. 2 A cross-sectional view of the glazing laminate of the invention showing a core laminate laminated to a film laminate wherein the core laminate has additional material laminated to an exterior surface.

In a second embodiment of the instant invention, as shown in FIG. 2, the core laminate as shown in FIG. 1 additionally possesses an exterior primer layer, 11, and an exterior hardcoat layer, 12. In this embodiment, the film or film laminate is shown as being on the interior surface of the glazing laminate of the invention.

Figure 3:
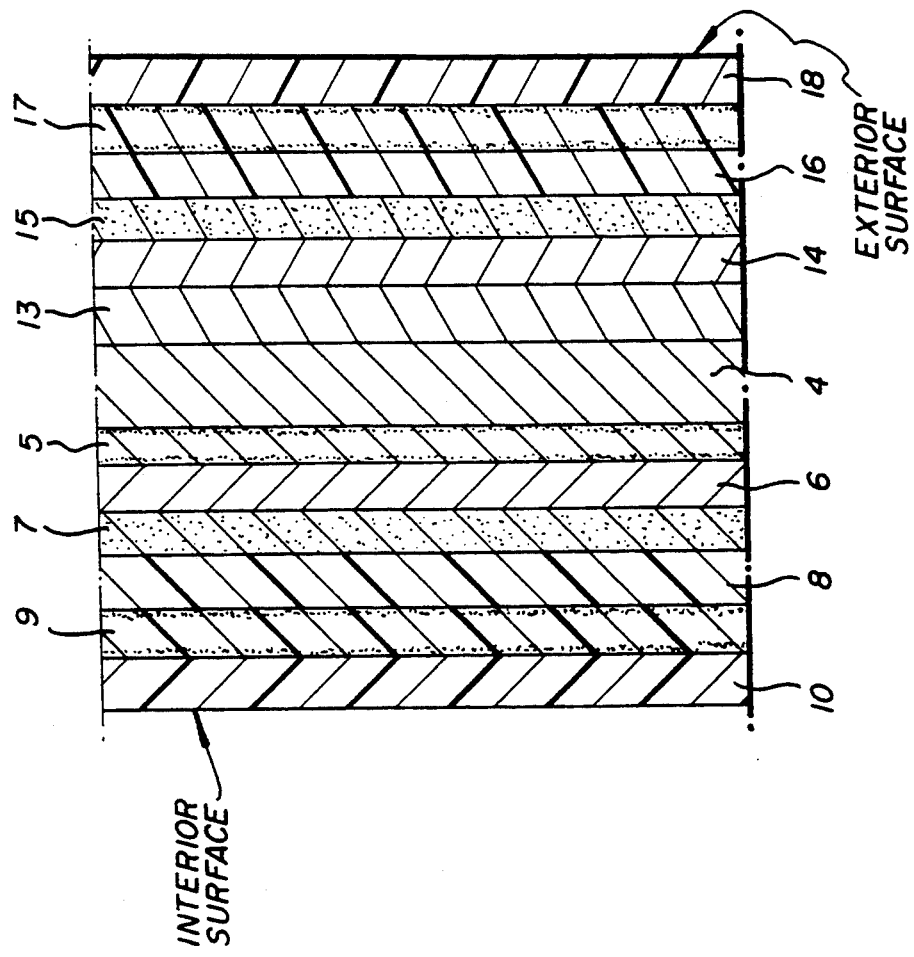
FIG. 3 A cross-sectional view of the glazing laminate of the invention showing a core laminate laminated to a film laminate wherein the core laminate has such film laminates laminated to both the interior and exterior surfaces of the core laminate.

In a third embodiment of the instant invention, as shown in FIG. 3, the glazing laminate as shown in FIG. 1 additionally possesses on an exterior side an exterior primer, 13, an exterior hardcoat, 14, laminated to an exterior film, 16, an optional exterior film primer, 17, and an exterior hardcoat, 18 bonded to the exterior surface of the glazing laminate by means of a layer of pressure sensitive adhesive, 15. The exterior film, 16, the optional exterior primer, 17, and the exterior hardcoat, 18, comprise a film laminate as previously defined herein. As a consequence of defining interior and exterior surfaces, the film, 8, becomes an interior film, the optional primer for the film, 9, becomes an optional interior primer for the film, and the hardcoat for the film, 10, becomes an interior hardcoat for the film. The optional interior and exterior film primers may be identical or different. The interior and exterior film hardcoats may be identical or different. The pressure sensitive adhesives used to bond the interior and exterior film laminates to the substrate may be identical or different.

The various embodiments illustrated in the figures are not meant to limit the scope of the appended claims but are merely illustrative of the variety of applications that may be devised from a glazing laminate having a replaceable sacrificial layer.

In applications where a useful optical clarity is desirable the materials should be selected for their optical properties. Additionally, when clarity is a consideration, when a pressure sensitive adhesive is utilized to replaceably adhere the film or film laminate to the substrate or core laminate, then the pressure sensitive adhesive should be applied to the film or film laminate such that when the film or film laminate is removed from the substrate or core laminate the pressure sensitive adhesive is also removed from the substrate or core laminate thereby permitting cleaning and/or polishing of the substrate or core laminate prior to replaceably adhering a new or replacement film or film laminate to the substrate or core laminate. When transparency or clarity is not as critical to the desired application of the laminate of the invention, if a pressure sensitive adhesive is used to replaceably adhere the film or film laminate to the substrate or core laminate then the pressure sensitive adhesive may remain as a layer laminated to the substrate or core laminate.

The substrate, 4, from which the core laminate is produced is selected from the group of plastic glazing materials known in the art. The preferred glazing material for said substrate is selected from the group consisting of polycarbonate and polymethylmethacrylate. When the substrate, 4, is polycarbonate, it may be desirable to add stabilizers to the polycarbonate to protect it from the deleterious effects of ultraviolet radiation or to include stabilizers for protection from ultraviolet light in the hardcoat and or optional primer such as taught in U.S. Pat. No. 4,278,804.

The optional primer is a component, known in the art, that allows the hardcoat to be bonded to the substrate allowing for differences in the coefficient of thermal expansion. In those cases where there is not a good match in the coefficient of thermal expansion between the hardcoat and the substrate, the optional primer becomes desirable because it promotes adhesion between the two layers. Such primers are the subject of teachings and disclosures in the following U.S. Pat. Nos.: 4,313,979; 4,395,463; 4,477,499 and 4,559,271. More recently U.S. Pat. No. 5,041,313 is directed to a method for making silicone hardcoat composites and primer compositions therefor whereby the primer and hardcoat are applied to an aromatic thermoplastic substrate. Polycarbonate is such an aromatic thermoplastic.

If there is a sufficiently good match in the coefficient of thermal expansion between the hardcoat and the substrate, the optional primer becomes less desirable or unnecessary. The criterion to be employed in determining the desirability of employing the optional primer is whether a sufficient adhesion would exist between the substrate and the hardcoat such that the optional primer was not necessary to insure good adhesion. These same considerations apply to the hardcoat and the optional primer used on the film. When glass is the substrate or a component of the core laminate a match in the thermal coefficient of expansion between the glass and the other layers such as the primer and/or hardcoat and the film or film laminate becomes a more significant consideration. It should be noted that if the film comprises a polycarbonate then ultraviolet stabilizers should be added to either or both of the hardcoat and the optional primer.

The hardcoat may be any of several of those known in the art. U.S. Pat. No. 4,478,876 discloses a process for coating a solid substrate such as polycarbonates, polyesters, polymethylmethacrylate, polyacrylates, and polyamides with an abrasion resistant silicone hardcoat. U.S. Pat. No. 3,707,397 discloses an organopolysiloxane hardcoat for polycarbonate. U.S. Pat. No. 3,843,390 discloses polyester melamines and acrylic melamine hardcoats. U.S. Pat. No. 2,332,461 discloses allyl resin hardcoats.

The preferred means for replaceably adhering the film or film laminate to the substrate or core laminate utilizes a pressure sensitive adhesive. The pressure sensitive adhesive may be any of several of those known in the art. Acrylic based pressure sensitive adhesives are disclosed and enabled in U.S. Pat. Nos. RE 24,906; 3,558,574; 3,535,293; and 3,299,010. Silicone based pressure sensitive adhesives are disclosed and enabled in U.S. Pat. Nos. 2,857,356; 2,736,721; and 2,814,601. U.S. Pat. No. 4,370,358 discloses an ultraviolet light curable silicone that cures to a pressure sensitive adhesive. U.S. Pat. No. 4,791,163 discloses an aqueous emulsion of an organic pressure sensitive adhesive and a silicone based pressure sensitive adhesive. More recently, U.S. Pat. No. 5,190,827 discloses a solventless organopolysiloxane composition that cures to a pressure sensitive adhesive composition.

A laminate of the instant invention where the materials for the substrate and the film were forms of polycarbonate and the replaceably adhering means was a pressure sensitive adhesive has been prepared and tested in a transportation glazing application for over one hundred and twenty days. The film or film laminate layer of the laminate of the invention has been subjected to damage by the test population and has not suffered any penetration. Thus the substrate or core laminate has been protected by the film or film laminate. Consequently, this new laminate structure satisfies a long felt need for a transportation glazing that is easily repairable when damaged or defaced but which is not as breakable as glass. As a glazing laminate the material has been removed from service, the film or film laminate removed from the substrate or core laminate, a new film or film laminate replaceably adhered to the substrate or core laminate, and the repaired laminate returned to service.

Additionally, a laminate of the invention substantially identical to that tested in actual use was subjected to an accelerated weathering test. After a test period under conditions equivalent in severity to a year in actual use, the laminate was inspected. No loss in optical properties or degradation in color was observed. The laminate suffered no loss in integrity, i.e. no delamination was observed. There was no change in the properties of the adhesive utilized to replaceably adhere the film or film laminate to the substrate or core laminate.

Having described the invention, that which is claimed is:

1. A laminate consisting essentially of:
   (a) a substrate selected from the group consisting of glass, polycarbonate, and polymethylmethacrylate;
   (b) a film selected from the group consisting of polycarbonate and polymethylmethacrylate; and (c) an adhesive means for replaceably adhering the film to the substrate whereby the laminate may be repaired by replacing the film.

2. The laminate of claim 1 wherein the substrate is selected from the group consisting of polycarbonate and polymethylmethacrylate.

3. The laminate of claim 2 wherein the means for replaceably adhering the film to the substrate consists essentially of a pressure sensitive adhesive.

4. A laminate consisting essentially of a substrate and a film wherein the substrate is a core laminate comprising:
(i) a substrate selected from the group consisting of glass, polycarbonate, and polymethyl methacrylate; and
(ii) a hardcoat selected from the group consisting of allyl resin, polyester melamine, acrylic melamine, and organopolysiloxane hardcoats; and
the film is a film laminate comprising:
(i) a film selected from the group consisting of polycarbonate and polymethyl methacrylate; and
(ii) a hardcoat selected from the group consisting of allyl resin, polyester melamine, acrylic melamine, and organopolysiloxane hardcoats.

5. The laminate of claim 4 wherein the core laminate additionally contains a primer.

6. The laminate of claim 4 wherein the film laminate additionally contains a primer.

7. The laminate of claim 5 wherein the substrate is selected from the group consisting of polycarbonate and polymethylmethacrylate.

8. The laminate of claim 7 wherein the means for replaceably adhering the film laminate to the core laminate consists essentially of a pressure sensitive adhesive.

9. The laminate of claim 1 wherein the substrate consists essentially of glass.

10. The laminate of claim 9 wherein the film is a film laminate.

11. A laminate consisting essentially of:
(a) a plastic glazing substrate,
(b) an optical film, and
(c) an adhesive means for replaceably adhering said film to said substrate whereby said laminate may be repaired by replacing said film.

12. A method for assembling a laminate consisting essentially of:
(a) selecting a substrate from the group consisting of glass, polycarbonate, and polymethylmethacrylate;
b) selecting a film from the group consisting of polycarbonate and polymethylmethacrylate; and
(c) replaceably adhering said film to said substrate whereby the laminate may be repaired by replacing the film.

13. The method of claim 12 wherein the substrate is a core laminate and the film is a film laminate.

14. A method for repairing the laminate of claim 12 comprising:
(a) removing a damaged film adhering to a substrate from said substrate,
(b) replacing said damaged film with an undamaged film, and
(c) replaceably adhering said undamaged film to said substrate by adhesive means.

15. The method of claim 14 wherein the film is a film laminate and the substrate is a core laminate.

* * * * *